(12) United States Patent
Tsunehara (10) Patent No.: US 7,244,002 B2
(45) Date of Patent: Jul. 17, 2007

(54) VEHICLE BRAKE SYSTEM

(75) Inventor: Hiroshi Tsunehara, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 102 days.

(21) Appl. No.: 10/986,195

(22) Filed: Nov. 12, 2004

(65) Prior Publication Data

US 2005/0110338 A1   May 26, 2005

(30) Foreign Application Priority Data

Nov. 20, 2003   (JP) .............................. 2003-390899

(51) Int. Cl.
*B60T 8/40* (2006.01)
(52) U.S. Cl. ............................... 303/116.2; 303/113.1; 303/114.1
(58) Field of Classification Search ................. 303/10, 303/113.2, 113.4, 116.1, 116.2, 119.1; 60/562, 60/566, 568, 588
See application file for complete search history.

(56) References Cited

U.S. PATENT DOCUMENTS

| | | | | |
|---|---|---|---|---|
| 5,261,730 A | * | 11/1993 | Steiner et al. | ........... 303/113.4 |
| 5,588,718 A | * | 12/1996 | Winner et al. | ........... 303/113.1 |
| 6,192,685 B1 | * | 2/2001 | Bourlon et al. | ............... 60/566 |
| 6,267,456 B1 | * | 7/2001 | Crombez | ................. 303/115.1 |
| 6,543,859 B2 | * | 4/2003 | Sakamoto | ................ 303/113.2 |
| 6,733,090 B2 | * | 5/2004 | Pasterkamp et al. | ..... 303/114.1 |
| 6,746,088 B2 | * | 6/2004 | Chris | ....................... 303/114.1 |
| 6,959,547 B2 | * | 11/2005 | Beccafico et al. | ............ 60/562 |
| 6,991,303 B2 | * | 1/2006 | Woll | ....................... 303/116.2 |
| 7,032,982 B2 | * | 4/2006 | Ogiwara et al. | ......... 303/114.1 |
| 7,069,725 B2 | * | 7/2006 | Delage et al. | ................ 60/566 |

FOREIGN PATENT DOCUMENTS

JP   2000-168536 A   6/2000

* cited by examiner

*Primary Examiner*—James McClellan
*Assistant Examiner*—Mariano Sy
(74) *Attorney, Agent, or Firm*—Foley & Lardner LLP (57) ABSTRACT

A brake-by-wire type vehicle brake system is arranged to return a piston of a master cylinder to a normal position by opening a shutoff valve so as to supply a hydraulic pressure of a pump to the master cylinder when the shutoff valve is closed and a stroke simulator is put in shutoff state and to close the shutoff valve when the stroke simulator is put in communicating state by returning the pistons of the master cylinder to the normal position.

16 Claims, 9 Drawing Sheets

VEHICLE BRAKE SYSTEM

BACKGROUND OF THE INVENTION

The present invention relates a brake-by-wire type brake system for a vehicle, which system is arranged to generate braking force requested by a driver's brake manipulation using a unit hydraulic pressure obtained by controlling a hydraulic pressure of a hydraulic source different from a brake hydraulic source directly operated by the driver's brake manipulation.

Various electronically-controlled hydraulic brake systems have been proposed and put in practical use, in order to meet the need of executing a vehicle behavior dynamic control using an automatic braking and/or a right-and-left wheel braking force difference control and the need of electronizing an anti-skid control system. For example, Japanese Published Patent Application No. 2000-168536 discloses an electronically-controlled brake system in which an electronically-controlled shutoff valve is disposed in a brake hydraulic pressure circuit for supplying a hydraulic pressure to wheel cylinders from a master cylinder operating in response to the depression of a brake pedal. The electronically controlled brake system further comprises a hydraulic source constructed by a pump for receiving working fluid of a reservoir of a master cylinder and discharging the working fluid, an electric motor for driving the pump and an accumulator for accumulating the working fluid supplied from the pump. This brake system executes an electronic control of a brake-unit hydraulic pressure independently of the control of a master cylinder hydraulic pressure, by increasing the brake-unit hydraulic pressure in the wheel cylinder using the accumulator inner pressure through a pressure increasing valve and decreasing the brake-unit hydraulic pressure through a pressure decreasing valve under a condition that the brake hydraulic pressure circuit of connecting the master cylinder and the wheel cylinders is shut off.

SUMMARY OF THE INVENTION

Such arranged brake-by-wire type brake system is required to maintain a brake pedal depressing feeling even during the electronic control of the brake unit hydraulic pressure. Therefore, it is necessary to provide a stroke simulator in the brake hydraulic pressure circuit connecting the shutoff valve and the master cylinder.

Generally a brake-by-wire brake system is provided with a fail-safe system arranged to open the shutoff valve to use the master cylinder hydraulic pressure instead of the brake unit hydraulic pressure when an electronic control system for the brake hydraulic pressure is put in malfunction state, in order to prevent the brake system from being put in an inoperable state even when the electronic control of the brake unit hydraulic pressure becomes inoperable due to the trouble of the electronic control system. However, when the master cylinder hydraulic pressure is used instead of the brake unit hydraulic pressure, it is not necessary to use the stroke simulator since the brake hydraulic pressure is generated while the master cylinder strokes. Accordingly, it is necessary to put the communication between the brake hydraulic pressure circuit and the stroke simulator into shutoff state during the abnormal state wherein the master cylinder hydraulic pressure is used instead of the brake unit hydraulic pressure by opening the shutoff valve.

Conventionally, it has been normally executed to use a solenoid valve for shutting off and communicating the stroke simulator with the brake hydraulic pressure circuit. However, to employ such a solenoid valve increases the cost of the brake-by-wire type brake system. Therefore, the brake-by-wire type brake system is generally arranged such that when the brake system operates as a brake-by-wire system under the shutoff valve closed condition, the master cylinder generates a hydraulic pressure without stroking the master cylinders, in theory. Accordingly, there is an idea that a stroke simulator is installed in the brake system so as to mechanically link with the piston stroke of the master cylinder, to communicate with the master cylinder when a piston of the master cylinder is positioned at a normal position at which no brake manipulation force is applied to the master cylinder, so as to achieve the original function, and to shutoff the communication between the stroke simulator and the master cylinder when the piston of the master cylinder strokes according to the driver's brake manipulation.

However, such an arrangement of a stroke simulator may cause the following problem. When an ignition switch of a vehicle is turned off, all valves and a control system of a brake-by-wire type brake system are put in off state. A shutoff valve is generally of a normal open type so as to enable the brake control using the master cylinder hydraulic pressure even if the control signal is not generated due to the trouble of the control system. For example, in case that the driver depresses a brake pedal before the ignition switch is turned on, a master cylinder strokes according to the depression of the brake pedal, then a stroke simulator is put in shutoff state relative to a brake hydraulic circuit according to the stroke of the master cylinder. Following this, the shutoff valve is closed in response to the turning on of the ignition switch. Under this case, a piston of the master cylinder stays at a depressed position and the stroke simulator is maintained in the shutoff state even if a driver's foot is released from the brake pedal since the master cylinder is hydraulically closed. Although this shutoff state of the stroke simulator does not prevent the function of the brake-by-wire type brake system, the stroke simulator is put in inoperable state. This obliges a driver to execute a brake manipulation without a stroke of the brake pedal, and therefore the driver has a strange manipulation feeling in brake manipulation.

It is therefore an object of the present invention to provide a brake-by-wire type brake system for a vehicle which system reflects the discovery that it is possible to forcibly return a stroke simulator into a communicating state using a hydraulic pressure of a hydraulic source different from a first motion means such as a master cylinder or the discovery that in case of a two-line type brake-by-wire system using a tandem master cylinder as a first motion means, a strange feel in a brake manipulation can be cancelled by operating one of the two-lines as a brake-by-wire system and by operating the other of the two-lines directly using the hydraulic pressure of the master cylinder.

An aspect of the present resides in a vehicle brake system which comprises a first motion means having a first motion element which moves according to a driver's brake manipulation, the first motion means outputting a brake hydraulic pressure according to a depressing force of the first motion element; a wheel brake unit through which a braking force is generated at wheels; a brake hydraulic pressure output circuit connecting the first motion means and the wheel brake unit; a shutoff valve disposed in the brake hydraulic circuit, the shutoff valve shutting off a fluid communication between the first motion means and the wheel brake unit; a hydraulic source different from the first motion means, the hydraulic source being connected to the brake hydraulic pressure output circuit between the shutoff valve and the wheel brake unit; a hydraulic pressure controlling means for producing a unit hydraulic pressure in the brake hydraulic pressure output circuit between the shutoff valve and the wheel brake unit by controlling a hydraulic pressure of the hydraulic source different from the first motion means according to the brake hydraulic pressure of the first motion means when the shutoff valve is closed; a stroke simulator being shut off from the first motion means when the first motion element moves from a normal position, the stroke simulator being communicated with the first motion means so as to generate a stroke of the driver's brake manipulation when the shutoff valve is closed and the first motion element is positioned at the normal position; a stroke-simulator shutoff/communication detecting means detecting whether the stroke simulator is in shutoff state or communicating state when the shutoff valve is closed; and a stroke-simulator state controlling means returning the first-motion element to the normal position using the hydraulic pressure of the hydraulic source by temporally opening the shutoff valve when the shutoff valve is closed and the stroke simulator is put in shutoff state, the stroke-simulator state controlling means closing the shutoff valve when the stroke simulator is put in communicating state due to the returning of the first motion element to the normal position.

Another aspect of the present invention resides in a vehicle brake system which comprises a tandem master cylinder having a primary piston which strokes according to a driver's brake manipulation and a secondary piston which strokes according to the driver's brake manipulation through the primary piston; first and second wheel brake units through which a braking force is generated at wheels; first and second brake hydraulic pressure output circuits through which a hydraulic pressure generated by the tandem master cylinder is supplied to the first and second wheel brake units, respectively; first and second shutoff valves disposed in the first and second brake hydraulic pressure output circuits, respectively, the first and second shutoff valves being capable of shutting off the communications between the tandem master cylinder and the first and second wheel brake units, respectively; a hydraulic source different from the tandem master cylinder, the hydraulic source being connected to the first brake hydraulic pressure output circuit between the first shutoff valve and the first wheel brake unit and the second brake hydraulic pressure output circuit between the second shutoff valve and the second wheel brake unit; a hydraulic pressure controlling means for producing a first unit hydraulic pressure at the first brake hydraulic pressure output circuit between the first shutoff valve and the first wheel brake unit and a second unit hydraulic pressure at the second brake hydraulic pressure output circuit between the second shutoff valve and the second wheel brake unit by controlling a hydraulic pressure of the hydraulic source different from the tandem master cylinder on the basis of a hydraulic pressure detection value of the tandem master cylinder when both of the first and second shutoff valves are closed; a stroke simulator being shut off from the tandem master cylinder when the secondary piston moves from a normal position, the stroke simulator being communicated with the first motion means so as to generate a stroke of the driver's brake manipulation when the shutoff valve is closed and the secondary piston is positioned at the normal position; a stroke-simulator shutoff/communication detecting means for detecting whether the stroke simulator is in shutoff state or communicating state relative to the tandem master cylinder when both of the first and second shutoff valves are closed; a first hydraulic pressure supplying means for supplying the hydraulic pressure of the tandem master cylinder to the first brake hydraulic pressure output circuit by opening the first shutoff valve when both of the first and second shutoff valves are closed and the stroke simulator is put in shutoff state; and a second hydraulic pressure supplying means for supplying the hydraulic pressure of the hydraulic source different from the tandem master cylinder to the second brake hydraulic pressure output circuit by closing the second shutoff valve when both of the first and second shutoff valves are closed and the stroke simulator is put in shutoff state.

A further aspect of the present invention resides in a method of controlling a brake-by-wire type brake system which comprises a master cylinder having a piston depressed according to a driver brake manipulation, a wheel brake unit through which braking force is generated at wheels according to the brake hydraulic pressure, a brake hydraulic pressure output circuit connecting the tandem master cylinder and the wheel brake unit, a shutoff valve disposed in the brake hydraulic pressure output circuit and shutting off a fluid communication between the master cylinder and the wheel brake unit, a pump connected to the brake hydraulic pressure output circuit between the shutoff valve and the wheel brake unit and a stroke simulator connected to the master cylinder so as to generate a stroke of the driver's brake manipulation when the shutoff valve is closed and the piston of the mater cylinder is positioned at a normal position. The method comprises an operation of detecting whether the stroke simulator is put in communicating state or shutoff state relative to the master cylinder when the shutoff valve is closed, an operation of returning the piston of the master cylinder to a normal position by opening the shutoff valve so as to supply the hydraulic pressure of the hydraulic source different from the mater cylinder to the master cylinder when the shutoff valve is closed and the stroke simulator is put in shutoff state and an operation of closing the shutoff valve when the stroke simulator is put in communicating state by returning the pistons of the master cylinder to the normal position.

A further aspect of the present invention also resides in a method of controlling a brake-by-wire type brake system which comprises a master cylinder having a piston depressed according to a driver brake manipulation, a wheel brake unit through which braking force is generated at wheels according to the brake hydraulic pressure, a brake hydraulic pressure output circuit connecting the tandem master cylinder and the wheel brake unit, a shutoff valve disposed in the brake hydraulic pressure output circuit and shutting off a fluid communication between the master cylinder and the wheel brake unit, a pump connected to the brake hydraulic pressure output circuit between the shutoff valve and the wheel brake unit and a stroke simulator connected to the master cylinder so as to generate a stroke of the driver's brake manipulation when the shutoff valve is closed and the piston of the mater cylinder is positioned at a normal position. The method comprises an operation of producing a first unit hydraulic pressure at the first brake hydraulic pressure output circuit between the first shutoff valve and the first wheel brake unit and a second unit hydraulic pressure at the second break hydraulic pressure output circuit between the second shutoff valve and the second wheel brake unit by controlling a hydraulic pressure of the pump on the basis of a hydraulic pressure detection values of the tandem master cylinder when the shutoff valve is closed; an operation of detecting whether the stroke simulator is in shutoff state or communicating state when the both of the first and second shutoff valves are closed; an operation of supplying the hydraulic pressure of the tandem master cylinder to the first brake hydraulic pressure output circuit by opening the first shutoff valve when both of the first and second shutoff valve is closed and the stroke simulator is put in shutoff state; and an operation of supplying the hydraulic pressure of the pump to the second brake hydraulic pressure output circuit by closing the second shutoff valve when the stroke simulator is put in shutoff state.

The other objects and features of this invention will become understood from the following description with reference to the accompanying drawings.

DETAILED DESCRIPTION OF THE INVENTION

Hereinafter, there is discussed embodiments of a vehicle brake system according to the present invention, with reference to the drawings.

Figure 1:
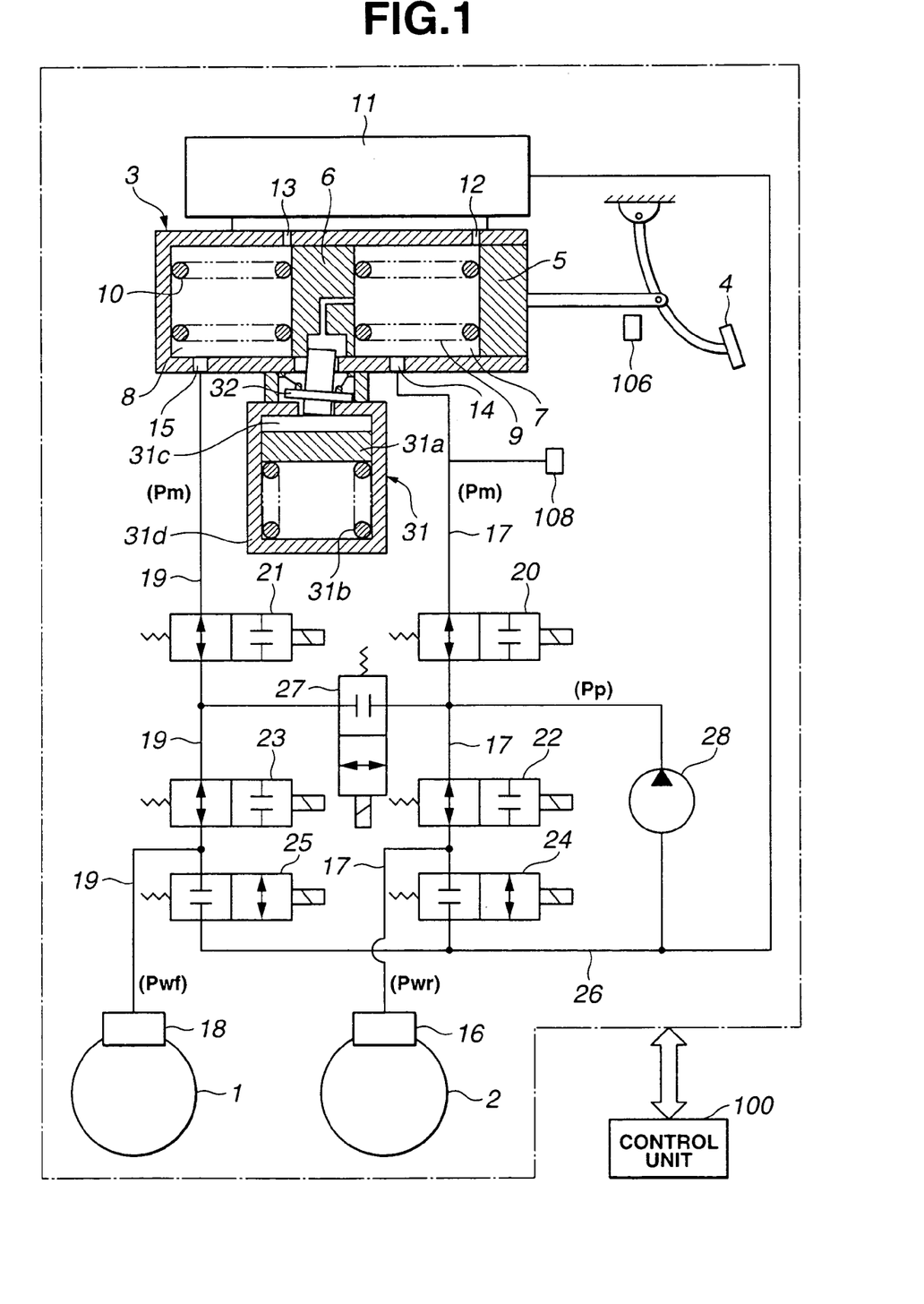
FIG. 1 is a schematic system view showing a first embodiment of a brake system according to the present invention.

FIG. 1 shows a first embodiment of a brake-by-wire type brake system for a vehicle in accordance with the present invention. As shown in FIG. 1, the brake system generates braking forces at front wheels 1 and rear wheels 2, respectively, although only one front wheel 1 and one rear wheel 2 are described in FIG. 1. The brake system is a two-line type brake system and is arranged such that one line of the brake system generates a braking force at front-right and front-left wheels 1 and the other line of the brake system generates a braking force at rear-right and rear-left wheels 2.

The brake system comprises a tandem master cylinder 3 functioning as a first motion means. Tandem master cylinder 3 comprises a primary piston 5 functioning as a primary first-motion element, which is connected to a brake pedal 4 and receives a brake manipulation force from brake pedal 4 and a secondary piston 6 functioning a secondary first-motion element which receives the brake manipulation force through primary piston 5. An inner space of master cylinder 3 is defined into a primary piston chamber 7 and a secondary piston chamber 8 by these primary and secondary pistons 5 and 6.

When no brake manipulation force is applied to brake pedal 4, primary and secondary pistons 5 and 6 are positioned at normal-state positions due to the biasing forces of return springs 9 and 10, respectively. When primary and secondary pistons 5 and 6 are positioned in the normal-state positions, input ports 12 and 13 of tandem master cylinder 3 are open so that primary and secondary piston chambers 7 and 8 fluidly communicate with a reservoir 11. When primary and secondary pistons 5 and 6 stroke in the depressed direction according to the brake manipulation force through brake pedal 4, primary and secondary pistons 5 and 6 directly close inlet ports 12 and 13, respectively, and therefore brake hydraulic pressure is generated in both of primary and secondary piston chambers 7 and 8.

Tandem master cylinder 3 further has outlet ports 14 and 15, which always communicate respectively with primary and secondary piston chambers 7 and 8. Outlet port 14 is connected to a rear-wheel brake hydraulic output circuit 17 communicated with brake units 16 of rear right and left wheels 2. Outlet port 15 is connected to a front-wheel brake hydraulic output circuit 19 communicated with brake units 18 of front right and left wheels 1.

Rear-wheel brake hydraulic output circuit 17 comprises a shutoff valve 20 and a pressure increasing value 22, which are sequentially arranged in order of mention from a near side of tandem master cylinder 3. Similarly, front-wheel brake hydraulic output circuit 19 comprises a shutoff valve 21 and a pressure increasing valve 23, which are also sequentially arranged in order of mention from a near side of tandem master cylinder 3. These shutoff and pressure increasing valves 20, 21, 22 and 23 are normal-open type solenoid valves which are closed when energized.

A reservoir circuit 26 connected to reservoir 11 is connected to a line between pressure increasing valve 22 and brake unit 16 and to a line between pressure increasing valve 23 and brake unit 18 through pressure decreasing valves 24 and 25, respectively. These pressure decreasing valves 24 and 25 are normal close type solenoid valves which are opened when energized. Another hydraulic source including a pump 28 is connected to brake hydraulic output circuit 17 connecting shutoff valve 20 and pressure increasing valve 22.

A stroke simulator 31 is attached to tandem master cylinder 3. Stroke simulator 31 is constructed by a piston 31a, a spring 31b and a cylinder 31d. When working fluid supplied from primary piston chamber 7 is fed into a chamber 31c defined by piston 31a and cylinder 31d, piston 31a strokes (moves) against the biasing force of spring 31b so as to perform a later discussed predetermined function.

An open/close valve 32 is disposed between stroke simulator 31 (chamber 31c) and a primary piston chamber 7 to control a fluid communication between stroke simulator 31 and primary piston chamber 7. Open/close valve 32 is arranged to open and close according to the stroke of secondary piston 6. More specifically, when secondary piston 6 is positioned at a normal position as shown in FIG. 1, open/close valve 32 is open to fluidly communicate stroke simulator 31 and primary piston chamber 7. When secondary piston 6 strokes in the pressing direction from the normal position, open/close valve 32 is closed to shut off the fluid communication between stroke simulator 31 and primary piston chamber 7.

The brake system according to the present invention further comprises a control unit 100 which obtains information indicative of a depression degree of brake pedal 4 and/or a stroke quantity of primary and second cylinders 5 and 6 from a stroke sensor 106, and obtains information indicative of a master cylinder pressure Pm from a pressure sensor 108 connected to one of circuits 17 and 19. Control unit 100 electrically controls solenoid valves 20-25 and 27 and pump 28 and is constructed by a computer system including a central control unit and peripheral devices.

Hereinafter, there is discussed a manner of operation of the brake system shown in FIG. 1.

When an ignition switch of the vehicle is turned on, shutoff valves 20 and 21 are turned on (energized) and are put in a closed state. Simultaneously, communication valve 27 is also turned on and is put in an open state. Under this condition, when a brake manipulation force is inputted to primary piston 5 in response to the driver's depressing operation of brake pedal 4, primary piston 5 closes inlet port 12, and a hydraulic pressure is generated in primary piston chamber 7. This brake hydraulic pressure presses secondary piston 6, and inlet port 13 is closed by secondary piston 6. Therefore, a brake hydraulic pressure is also generated in secondary piston chamber 8.

Since shutoff valves 20 and 21 have been closed, a brake hydraulic pressure Pm corresponding to a depressing force (brake manipulation force) of brake pedal 4 is generated in primary and secondary piston chambers 7 and 8 and is outputted to brake hydraulic output circuits 17 and 19 after inlet ports 12 and 13 are closed by pistons 5 and 6, respectively. Pistons 5 and 6 and brake pedal 4 become stopped in stroke since chambers 7 and 8 are hydraulically closed.

A small or slight stroke for closing inlet port 13 by secondary piston 6 does not close open/close valve 32 and keeps open/close valve 32 in an open state. A communicating state between stroke simulator 31 and primary piston chamber 7 is therefore maintained.

Accordingly, stroke simulator 31 is put in a condition that working fluid is capable of flowing from primary piston chamber 7 into chamber 31c, and therefore primary piston 5 can stroke so that the working fluid in primary piston chamber 7 is fed into chamber 31c of stroke simulator 31. Since piston 31a of stroke simulator 31 can stroke against a reaction force of spring 31b during this period, it is possible to return a load due to the spring reaction force to the driver. Consequently, the brake system according to the present invention can give a brake pedal manipulation feeling having a predetermined stroke-braking force characteristic to the driver.

Another hydraulic source including pump 28 operates in reply to the depression of brake pedal 4, and hydraulic pressure Pp thereof is supplied to the circuit 17 downstream of shutoff valve 20 and the circuit 19 downstream of shutoff valve 21 through communication valve 27 set in an open state. Accordingly, pressure increasing valves 22 and 23 and pressure decreasing valves 24 and 25 produce rear-wheel brake unit hydraulic pressure Pwr and front-wheel brake unit hydraulic pressure Pwf by controlling the hydraulic pressure Pp of pump 28 employed as source pressure and on the basis of hydraulic pressure Pm of master cylinder 3. These hydraulic pressures Pwr and Pwf are supplied to rear-wheel brake unit 16 and front-wheel brake unit 18, respectively. That is, pressure increasing valves 22 and 23 and pressure decreasing valves 24 and 25 construct a hydraulic pressure controlling means in the present invention.

Hereinafter, there is discussed a fail-safe operation executed when rear-wheel brake unit hydraulic pressure Pwr and front-wheel brake unit hydraulic pressure Pwf become uncontrolled for the reason that the operation of the brake-by-wire brake system becomes uncontrolled due to malfunction.

Under this troubled condition, all of solenoid valves 20 through 25 and 27 and pump 28 are turned off. That is, shutoff valves 20 and 21 are put in open state, pressure increasing valves 22 and 23 are put in open state, pressure decreasing valves 24 and 25 are put in closed state, and communication valve 27 is put in closed state.

By these settings of valves 20-25 and 27, hydraulic pressure Pm of master cylinder 3 to be supplied to circuits 17 and 19 are supplied to rear-wheel brake unit 16 and front-wheel brake unit 18 through shutoff valves 20 and 21 and pressure increasing valves 22 and 23, respectively. Accordingly, under this condition, the brake system according to the present invention functions as a hydraulic type brake system of executing braking operations directly using hydraulic pressure Pm of master cylinder 3 so as to generate braking force at the wheels 1 and 2.

Since the above-discussed brake-by-wire type brake system is arranged to fluidly connect and disconnect stroke simulator 31 with and from master cylinder 3 (primary piston chamber 7) by means of open/close valve 32 mechanically linked with secondary piston 6 of master cylinder 3, there is a possibility of generating the following problem.

For example, as shown in FIGS. 6A through 6J, in case that a driver depresses brake pedal 4 at a moment t0 before the ignition switch is turned on and the ignition switch is then turned on while brake pedal 4 being depressed at a moment t1, by the depression of brake pedal 4 prior to the turning on of the ignition switch, pistons 5 and 6 of master cylinder 3 are depressed since shutoff valves 20 and 21 being put in open state. Therefore, stroke simulator 31 is shut off from master cylinder 3 (primary piston chamber 7) by the closing of open/close valve 32 interlocking with the stroke of secondary piston 6. Under this condition, shutoff valves 20 and 21 are closed in replay to the turning on of the ignition switch at a moment t1.

Under this condition, even if the brake manipulation is stopped by releasing a driver's foot from brake pedal 4, pistons 5 and 6 in master cylinder 3 stay at the depressed positions and do not return to the normal position. Accordingly, stroke simulator 31 maintains the shutoff state.

Although this shutoff state does not avoid the above-discussed function of the brake-by-wire type brake system, stroke simulator 31 is put in inoperative state, and therefore, this situation obliges the brake manipulation without giving the stroke of brake pedal 4 (master cylinder 3) to the driver so that the driver has a strange feeling in the brake manipulation.

The brake-by-wire type brake system according to the present invention is therefore arranged to execute controls programs shown in FIGS. 2 through 5 in order to solve the above-discussed problem. More specifically, control unit 100 executes these control programs shown in FIGS. 2 through 5 in order to forcibly return stroke simulator 31 into the fluidly communicating state communicated with master cylinder 3. That is, control unit 100 executes a master cylinder pressure increasing operation using the hydraulic pressure of another pressure source (pump 28) different from master cylinder 3, through the execution of control programs shown in FIGS. 2 through 5.

Figure 2:
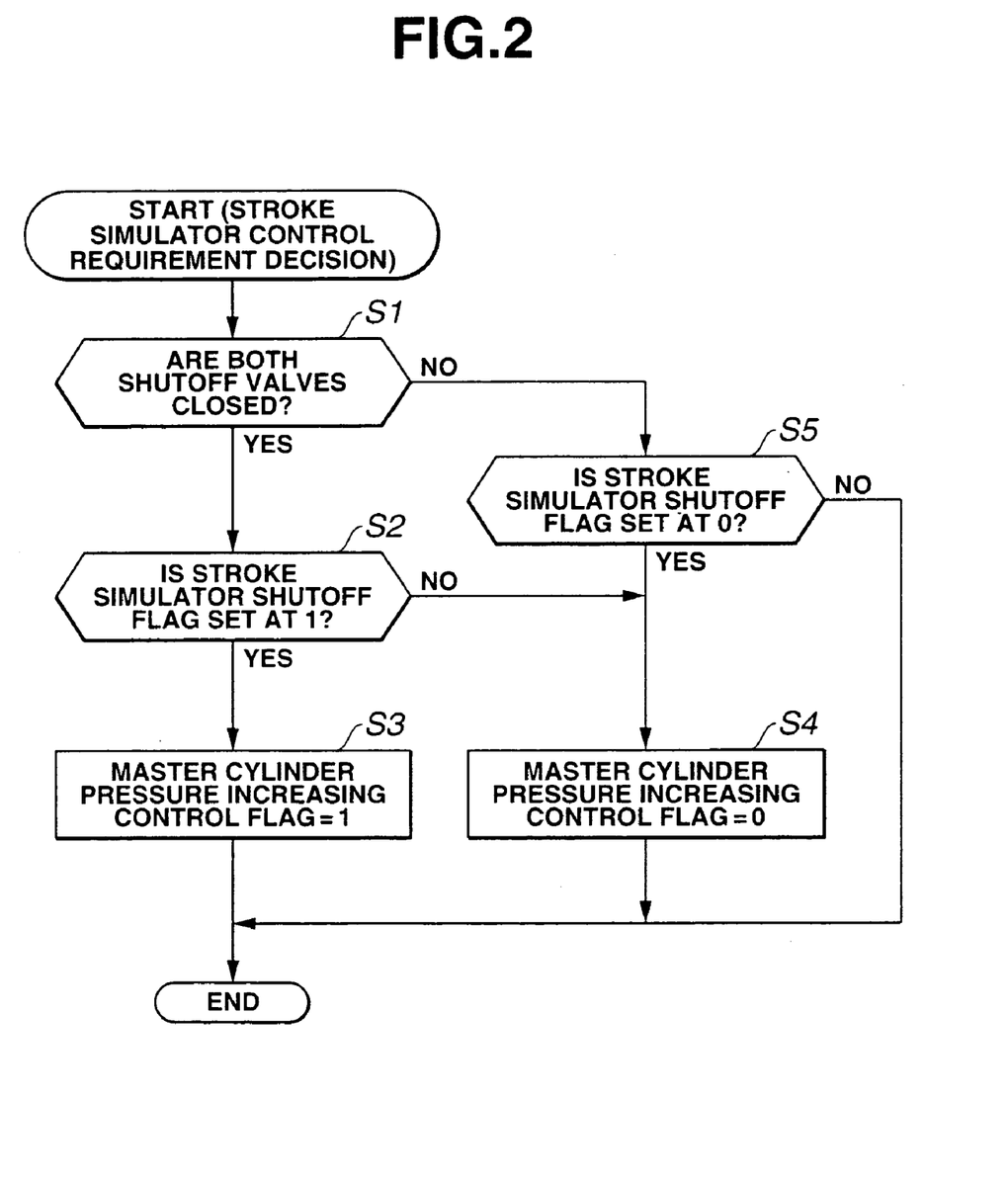
FIG. 2 is a flowchart showing a control program for determining whether or not it is necessary to execute a stroke simulator communication control of the brake system of FIG. 1.

FIG. 2 shows a program for determining whether or not it is necessary to execute a control of forcibly returning stroke simulator 31 into the fluidly communicated state.

At step S1, it is checked whether or not both shutoff valves 20 and 21 are put in closed state. When the determination at step S1 is affirmative, the program proceeds to step S2 wherein it is determined whether or not a stroke-simulator shutoff flag SSF is set at 1. This stroke-simulator shutoff flag SSF is set at 1 (SSF=1) when stroke simulator 31 is shut off from master cylinder 3, and stroke-simulator shutoff flag SSF is set at 0 (SSF=0) when stroke simulator 31 is fluidly communicated with master cylinder 3.

When it is determined at step S1 that both shutoff valves 20 and 21 are put in closed state and when it is determined at step S2 that stroke simulator shutoff flag SSF is set at 1 (SSF=1), it is determined that the above discussed problem relating to the strange brake manipulation feeling will occur. Therefore, at step S3 subsequent to the affirmative determination at step S2, a master-cylinder pressure-increasing command for putting stroke simulator 31 in the fluidly communicating state is outputted by setting a master-cylinder pressure-increasing control flag at 1, as is executed at a moment t2 in FIGS. 6A through 6J.

When the determination at step S2 is negative, that is, when stroke-simulator shutoff flag SSF is set at 0 (SSF=0), it is determined that no problem occurs. Therefore, the program proceeds to step S4 wherein master-cylinder pressure-increasing-control flag is reset at 0 and the master-cylinder pressure-increasing command is not outputted.

When the determination at step 1 is negative, that is, when it is determined at step S1 that at least one of shutoff valves 20 and 21 is put in open state due to the electrical turning off, the program proceeds to step S5 wherein it is determined whether or not stroke simulator 31 is put in the fluid communication state, by checking whether or not stroke-simulator shutoff flag SSF is set at 0. When the determination at step S5 is affirmative, that is, when stroke-simulator shutoff flag SSF is set at 0, the program proceeds to step S4 wherein the master-cylinder pressure-increasing-control flag is reset at 0, so as to prevent master cylinder pressure increasing command from being dully generated under the condition that piston 6 is position at the normal position.

When the determination at step S5 is negative, that is, when stroke-simulator shutoff flag SSF is not set at 0 (communicating state of stroke simulator 31), the program proceeds to an end block to terminate the present routine and to maintain master cylinder shutoff flag at the present state.

Figure 3:
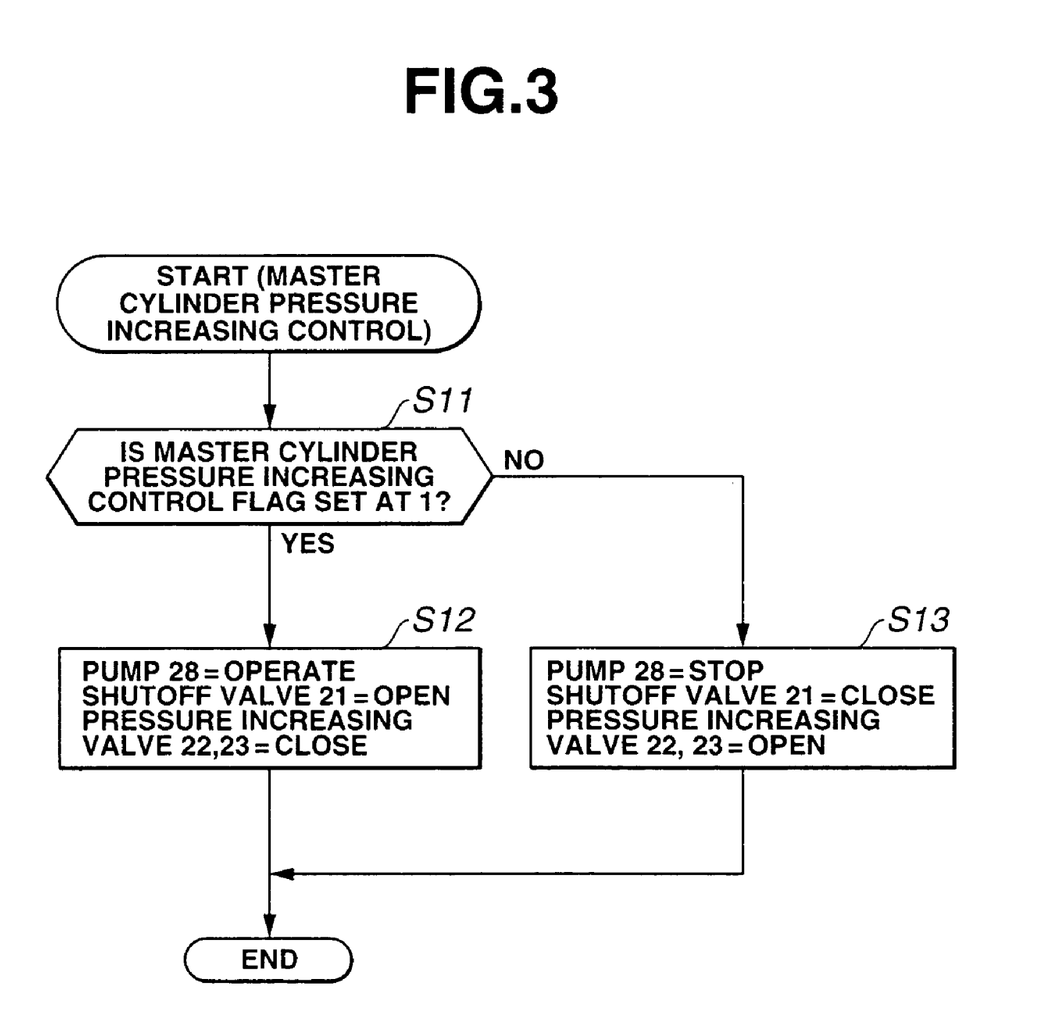
FIG. 3 is a flowchart showing a program of executing the master cylinder pressure increasing control of the brake system of FIG. 1.

FIG. 3 shows the control program for forcibly retuning stroke simulator 31 to the fluid communication state by executing the master-cylinder pressure-increasing control using another hydraulic source (pump 28) different from master cylinder 3, in accordance with the master-cylinder pressure-increasing-control flag determined in the control program shown in FIG. 2. There is explained a processing of the flowchart shown in FIG. 3 with reference to the timer chart shown in FIGS. 6A-6J.

At step S11 it is determined whether or not master-cylinder pressure-increasing command for putting stroke simulator 31 into the fluid communicating state is outputted by determining whether or not master-cylinder pressure-increasing-control flag is set at 1. When it is determined at step S11 that master-cylinder pressure-increasing-control flag is set at 1, that is, when the master-cylinder pressure-increasing-control command is outputted, the program proceeds to step S12 wherein the following controls are executed against the above discussed state at the moment when the ignition switch is turned on. This affirmative determination at step S11 corresponds to the operation at a moment t2 in FIG. 6.

Accordingly, pump 28 is driven to output the hydraulic pressure Pp, shutoff valve 21 is turned on to put it in an open state, and pressure increasing valves 22 and 23 are turned on to put them in a closed state.

At a moment t1 in FIG. 6 at which the ignition switch is turned on, shutoff valve 20 it turned on and is put in closed state, and communication valve 27 is turned on and is put in closed state. Accordingly, hydraulic pressure Pp is supplied from pump 28 to secondary piston chamber 8 through communication valve 27, shutoff valve 21 and circuit 19.

Figure 6A:
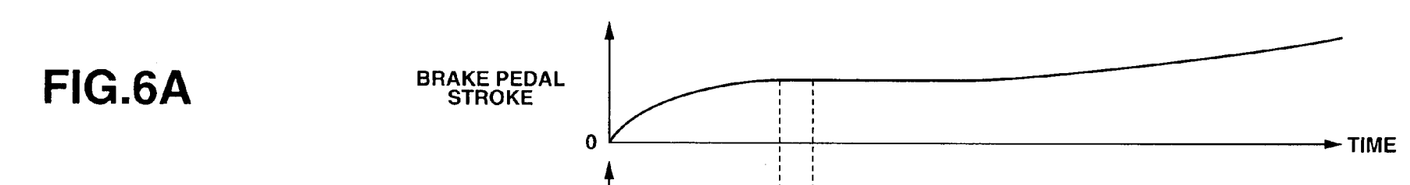
FIGS. 6A through 6J are time charts showing the control of FIG. 3.
Figure 6B:
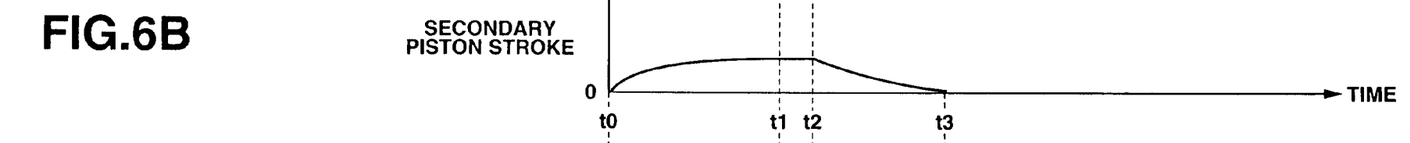
Figure 6C:
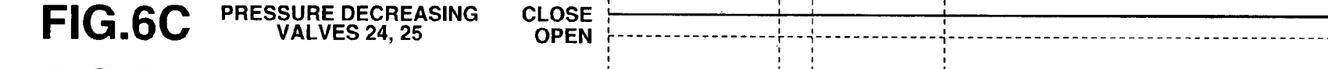
Figure 6D:
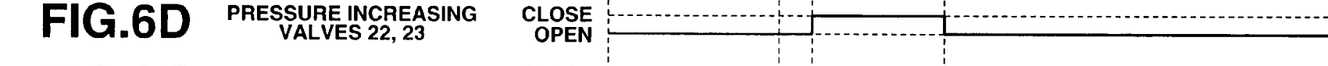
Figure 6E:
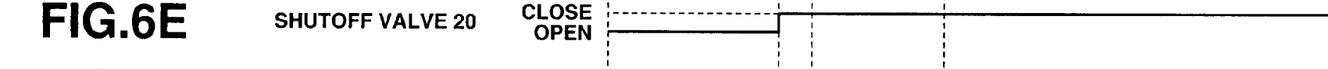
Figure 6F:
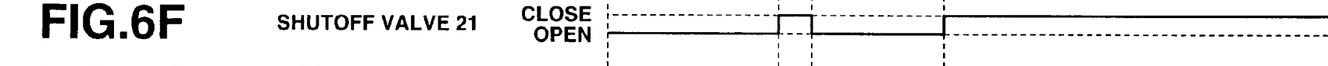
Figure 6G:
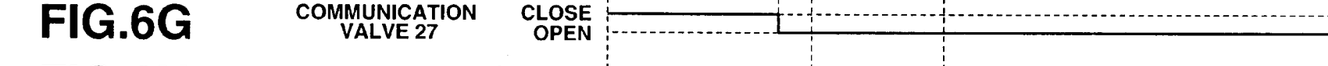
Figure 6H:
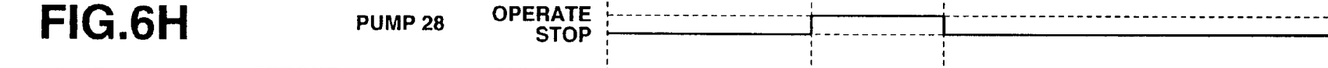
Figure 6I:
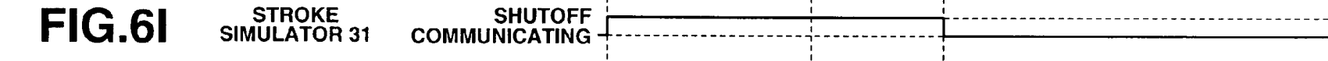
Figure 6J:
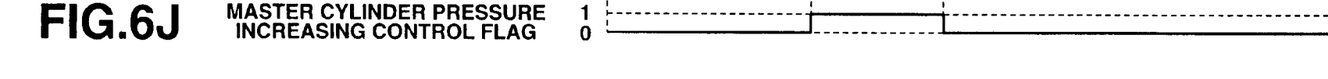

Hydraulic pressure Pp supplied to secondary piston chamber 8 returns secondary piston 6 stayed at the depressed position, as shown in 6B indicating the stroke change of secondary piston 6. At this moment, primary piston 5 is also returned against the depression force of brake pedal 4 due to the working fluid in the primary piston chamber 7, and at last both pistons 6 and 5 are returned to normal positions, respectively. By returning secondary piston 6 to the normal position (stroke=), open/close valve 32 put in closed state is put into open state, and therefore it becomes possible to put stroke simulator 31 into the fluidly communicating state shown in FIG. 1 at a moment t3 in FIG. 6I.

When stroke simulator 31 is put in fluidly communicating state, stroke-simulator shutoff flag SSF is set at 0 at step S2 by the later discussed processing explained by a flowchart of FIG. 5. Therefore, at step S4 master-cylinder pressure-increasing-control flag is set at 0. As a result, the negative determination is made at step S1 in FIG. 3, and the program proceeds to step S13 wherein pump 28 is turned off to stop outputting hydraulic pressure Pp, shutoff valve 21 is turned on to be put in closed state, and pressure increasing valves 22 and 23 are turned on to be put in open state, as shown at a moment t3 in FIGS. 6H, 6F and 6D.

With the first embodiment of the brake system according to the present invention, in case that stroke simulator 31 is put in shutoff state when shutoff valves 20 and 21 are closed by the turning on of the ignition switch, shutoff valve 21 relating to secondary piston chamber 8 is temporally opened and therefore pistons 5 and 6 of master cylinder 3 are returned to the normal positions due to the hydraulic pressure Pp of pump 28, and shutoff valve 21 is then closed after stroke simulator 31 is put in fluidly communicating state by the returning of secondary piston 6.

Even if stroke simulator 31 is put into shutoff state when shutoff valves 20 and 21 are closed to operate the brake system as a brake-by-wire system, pistons 5 and 6 of master cylinder 3 are returned to the normal positions due to the hydraulic pressure Pp of pump 28 so as to put stroke simulator 31 into the fluidly communicating state with master cylinder 3. Thereafter, by closing shutoff valve 21, it becomes possible to normally operate stroke simulator 31 and to operate the brake system as a brake-by-wire system.

The brake system according to the present invention can prevent stroke simulator 31 from becoming inoperative when the brake system operates as a brake-by-wire system. This solves the problem that braking is executed without occurring a strange brake manipulation feeling including no stroke of brake pedal 4 (brake pedal fixed state).

Subsequently, there is discussed a stroke-simulator shutoff flag determination process with reference to FIGS. 4 and 5.

Figure 4:
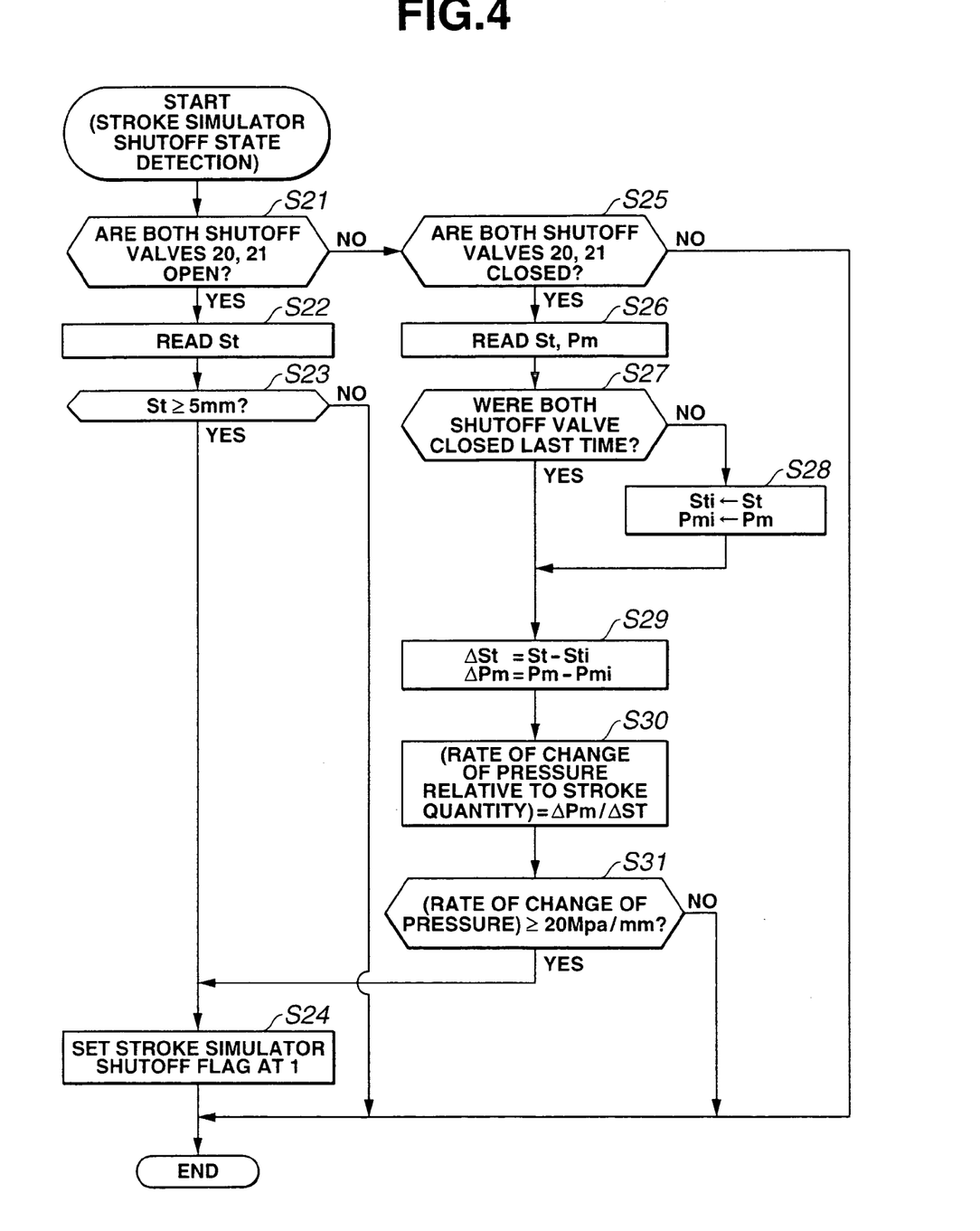
FIG. 4 is a flowchart showing a program of detecting a shutoff state of the stroke simulator relative to a master cylinder.
Figure 5:
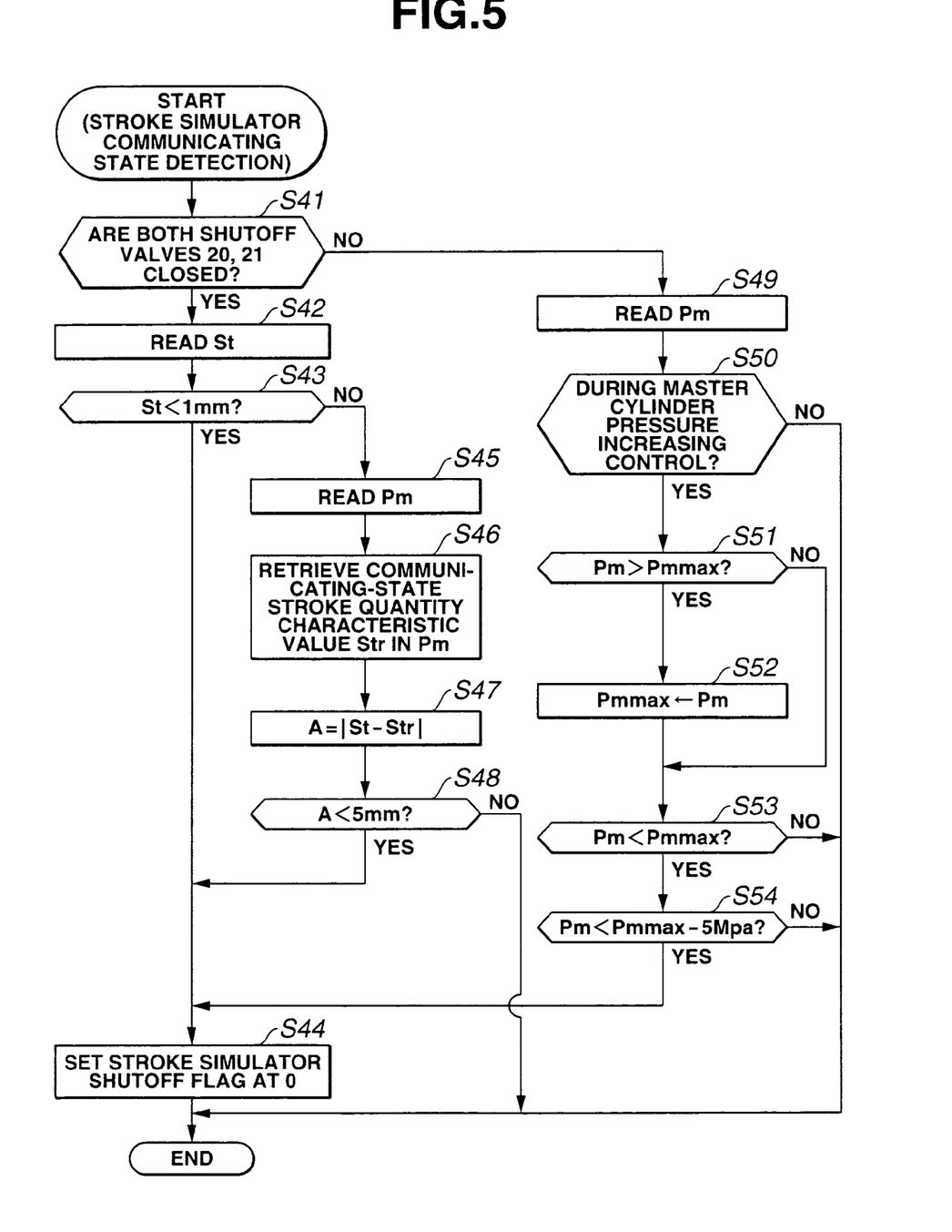
FIG. 5 is a flowchart showing a program of detecting a communicating state of the stroke simulator relative to the master cylinder.

FIG. 4 shows the program for determining a shutoff state of stroke simulator 31, and FIG. 5 shows the program for determining a communication state of stroke simulator 31. These programs correspond to a stroke simulator shutoff/communication detecting means.

There is discussed a stroke-simulator shutoff state determination program shown in FIG. 4.

At step S21 it is determined whether or not both shutoff valves 20 and 21 are open. When the determination at step S21 is affirmative, that is, when both shutoff valves 20 and 21 are open, the program proceeds to step S22 wherein a brake manipulation stroke quantity detection value St for brake pedal 4 and/or pistons 5 and 6 is read. More specifically, control unit 100 receives the signal indicative of brake manipulation stroke quantity detection value St from stroke sensor 106.

At step S23 subsequent to the execution of step S22, it is determined whether or not stroke quantity detection value St is greater than or equal to a set value for determining a shutoff state of stroke simulator 31, such as 5 mm. When the determination at step S23 is affirmative (St≧5 mm), it is determined that stroke simulator 31 is put in shutoff state. Accordingly when the determination at step S23 is affirmative, the program proceeds to step S24 wherein a stroke-simulator shutoff flag SSF is set at 1 (SSF=1). When the determination at step S23 is negative (St<5 mm), it is determined that stroke simulator 31 is put in shutoff state, and therefore the program jumps to an end block to terminate the present control and maintain the stroke simulator shutoff flag SSF at a present state.

When the determination at step S21 is negative, that is, when it is determined at step S21 that at least one of shutoff vale is closed, the program proceeds to step S25 wherein it is determined whether or not both shutoff valves 20 and 21 are closed. When the determination at step S25 is negative, that is, when it is determined that one of shutoff valve is open, it is not necessary to determine the stroke simulator shutoff flag SSF. Therefore, the program jumps to the end block to terminate the present control and maintain the stroke simulator shutoff flag SSF at a present state.

When the determination at step S25 is affirmative, that is, when both shutoff valves 20 and 21 are closed, the program proceeds to step S26 wherein the brake manipulation stroke quantity detection value St and brake hydraulic pressure detection value Pm are read.

At step S27 subsequent to the execution of step S26, it is determined whether or not both shutoff valves 20 and 21 have been closed in the previous control (last time). When the determination at step S27 is negative, the program proceeds to step S28 wherein brake manipulation stroke quantity detection value St and brake hydraulic pressure detection value Pm are set at initial values Sti ad Pmi, respectively (Sti←St, Pmi←Pm), and the program then proceeds to step S29. When the determination at step S27 is affirmative, the program directly proceeds to step S29.

At step S29, there are calculated a difference ΔSt (ΔSt=St−Sti) of the brake manipulation stroke quantity detection value St relative to initial value Sti and a difference ΔPm (ΔPm=Pm−Pmi) of the brake hydraulic pressure detection value Pm relative to initial value Pmi.

At step S30, there is calculated a rate (ΔPm/ΔSt) of change of pressure, which is indicative of a rate of change of brake hydraulic pressure difference ΔPm relative to a stroke quantity difference ΔSt.

At step S31 it is determined whether or not the rate ΔPm/ΔSt is greater than a preset value of determining a shutoff state of stroke simulator 31, such as 20 Mpa/mm. When the determination at step S31 is affirmative (ΔPm/ΔSt≧20 Mpa/mm), the program proceeds to step S24 wherein stroke-simulator shutoff flag SSF is set at 1 (SSF=1). When the determination at step S31 is negative, the program proceeds to the end block to terminate the present control and maintain the stroke-simulator shutoff flag SSF at a present state.

The stroke-simulator shutoff state detection control shown in FIG. 4 may be arranged such that it is determined that stroke simulator 31 is put in shutoff state when shutoff valves 20 and 21 are closed during the brake manipulation by the driver through brake pedal 4 corresponding a period during the depression of secondary piston 6, although such a step has not been shown in FIG. 4.

Subsequently, there is discussed a communication state determination program of stroke simulator 31, with reference to FIG. 5.

At step S41 it is determined whether or not both shutoff valves 20 and 21 are closed. When the determination at step S41 is affirmative, that is, when both shutoff valves 20 and 21 are closed, the program proceeds to step S42 wherein brake manipulation stroke quantity St of brake pedal 4 and/or pistons 5 and 6 is read.

At step S43 subsequent to the execution of step S42, it is determined whether or not the stroke quantity detection value St is smaller than a second set value for determining the communicating state of stroke simulator 31, such as 1 mm. When the determination at step S43 is affirmative (St<1 mm), the program proceeds to step S44 wherein stroke-simulator shutoff flag SSF is set at 0 (SSF=0). When the determination at step S43 is negative (St≧1 mm), the program proceeds to step S45 to determine the communication state of stroke simulator 31.

At step S45 brake hydraulic pressure detection value Pm is read. At step S46 subsequent to the execution of step S45, stroke quantity characteristic value Str during the communicating state of stroke simulator 31 is retrieved on the basis of a predetermined map and from brake hydraulic pressure detecting value Pm.

At step S47, an absolute value A of a stroke quantity difference between stroke quantity detection value St and stroke quantity characteristic value Str (A=|St−Str|) is determined.

At S48 subsequent to the execution of step S47, it is determined whether or not the absolute value A of the stroke quantity difference is smaller than a first set value for determining the communicating state, such as 5 mm. When determination at step S48 is affirmative (A<5 mm), that is, when stroke simulator 31 is put in communicating state, the program proceeds to step S44 wherein stroke-simulator shutoff flag SSF is reset at 0 (SSF=0). When the determination at step S48 is negative, the program proceeds to an end block to terminate the present control and maintain the stroke-simulator shutoff flag SSF at a present state.

When the determination at step S41 is negative, that is, when it is determined at step S41 that at least one of shutoff valves 20 and 21 is open, the program proceeds to step S49 wherein brake hydraulic pressure detection value Pm is read. At step S50 subsequent to the execution of step S49, it is determined whether or not the master-cylinder pressure-increasing-control for communicating stroke simulator 31 (executed at step S12 in FIG. 3) is being executed.

When the determination at step S50 is affirmative, that is, when the master-cylinder pressure-increasing-control is being executed, the program proceeds to step S51 wherein it is determined whether or not brake hydraulic pressure detection value Pm is greater than a maximum value Pmmax, in order to determine whether or not brake hydraulic pressure detection value Pm is increasing.

When the determination at step S51 is affirmative (Pm>Pmmax), that is, when the brake hydraulic pressure detection value Pm is increasing, the program proceeds to step S52 wherein brake hydraulic pressure detection value Pm is updated at Pmmax (Pmmax←Pm). When the determination at step S51 is negative, the program proceeds to step S53. The increasing state of brake hydraulic pressure detection value Pm means that secondary piston 6 is now being returned from the depressed position at which stroke simulator 31 is put in shutoff state, to the normal position at which stroke simulator 31 is put in communicating state. In other words, this increasing state means that secondary piston 6 has not yet returned to the normal position, and stroke simulator 31 has not yet put in communicating state.

At step S53 subsequent to the execution of step S52, it is determined whether or not brake hydraulic pressure detection value Pm is smaller than maximum value Pmmax. The affirmative determination at step S53 (Pm>Pmmax) means that brake hydraulic pressure Pm is decreasing according to the opening of inlet port 12 due to the returning of secondary piston 6 to a neighborhood position of the normal position. When the determination at step S53 is affirmative, the program proceeds to step S54. When the determination at step S53 is negative, the program proceeds to the end block.

At step S54 it is determined whether or not brake hydraulic pressure detection value Pm is smaller than a value (Pmmax−5 Mpa) obtained by subtracting a predetermined pressure such as 5 Mpa from maximum value Pmmax. When the determination at step S54 becomes affirmative (Pm<Pmmax−5 Mpa), and it is determined that secondary piston 6 is returned to the normal position, and stroke simulator 31 is set in the communicating state. Therefore, the program proceeds to step S44 wherein stroke simulator shutoff flag SSF is set at 0 (SSF=0).

With the stroke-simulator shutoff/communication determination method discussed above, it is possible to execute the shutoff/communication determination of stroke simulator 31 using already-used detecting values St and Pm without newly adding means for detecting a stroke of stroke simulator 31.

Figure 7:
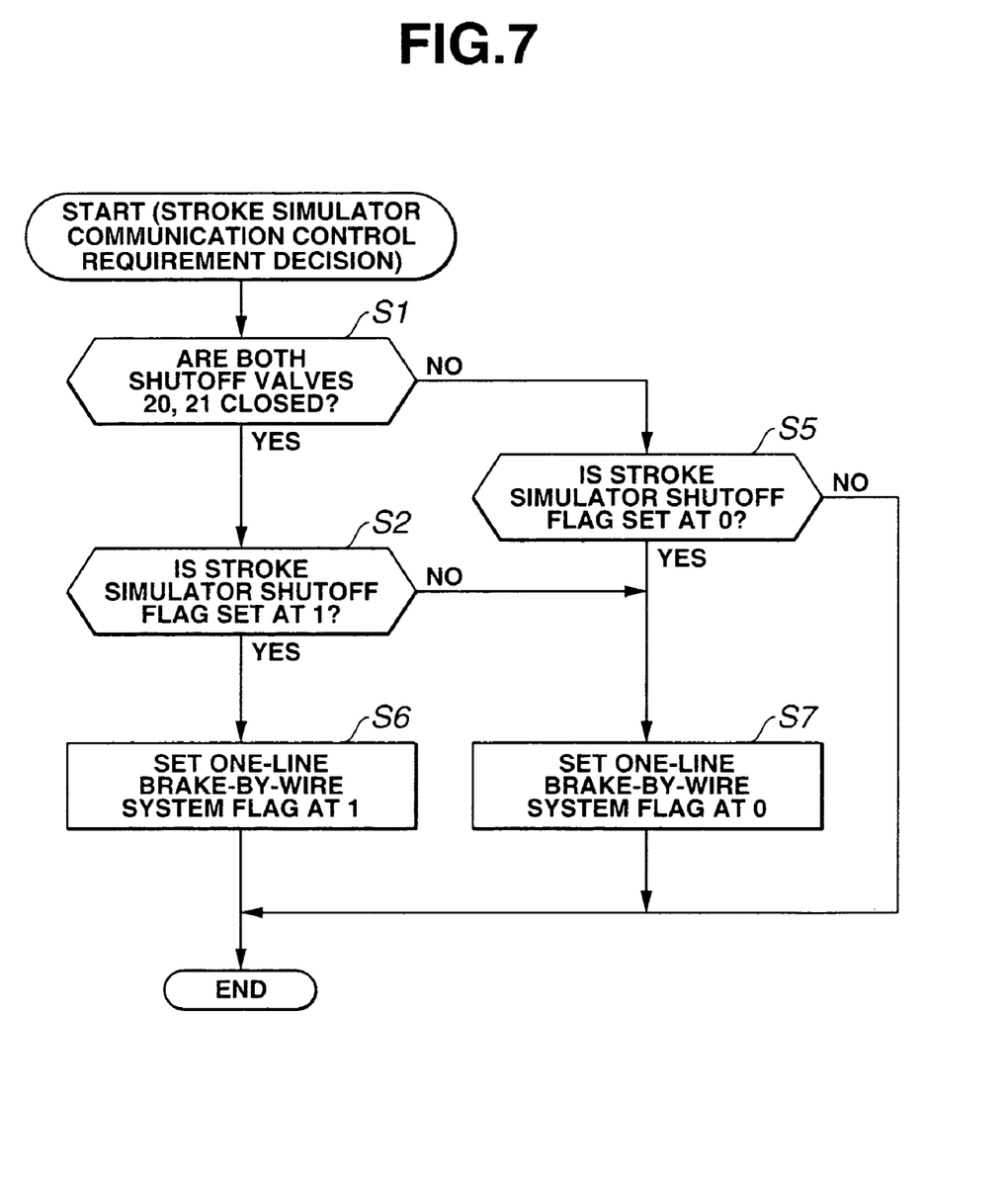
FIG. 7 is a flowchart showing a control program for determining whether or not it is necessary to execute the stroke simulator communication control of the brake system of a second embodiment according to the present invention.
Figure 8:
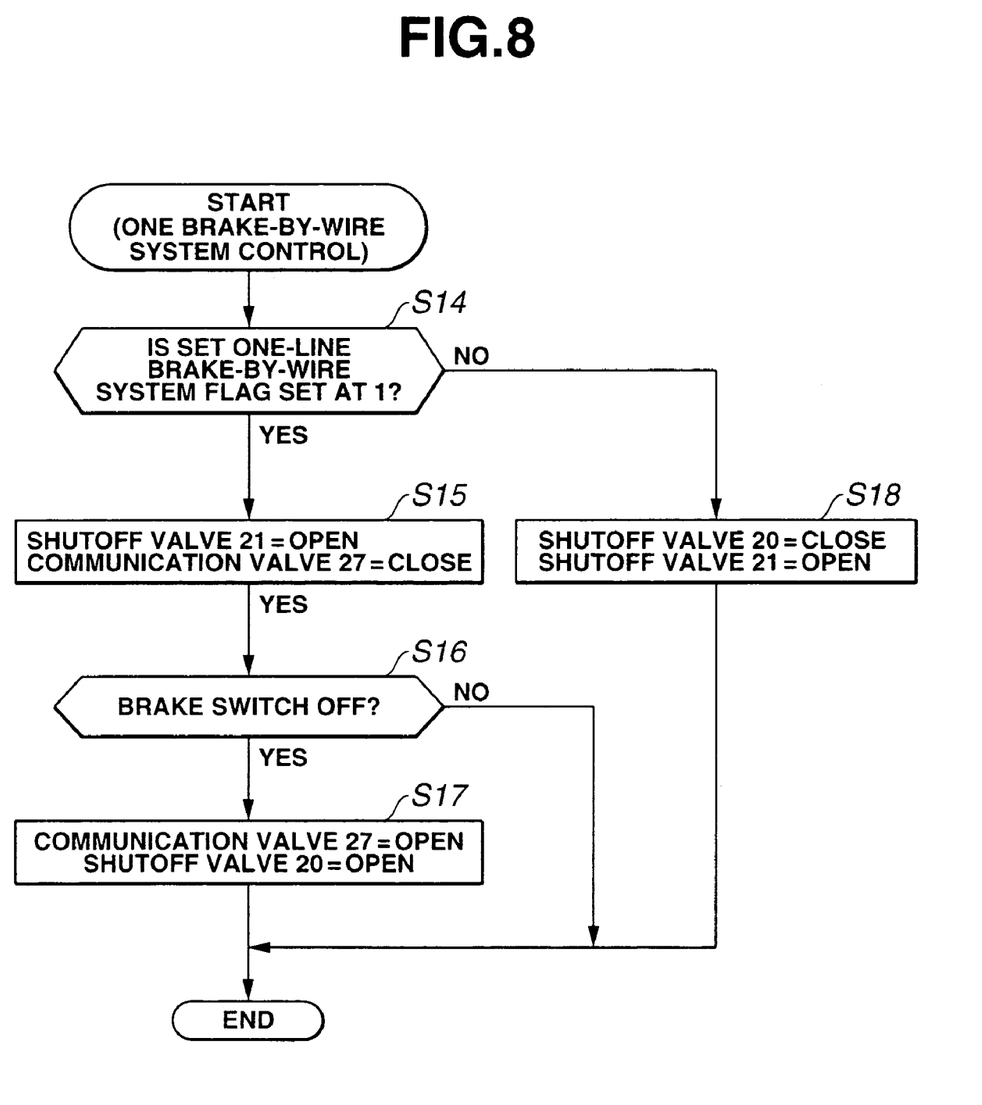
FIG. 8 is a flowchart showing a one-line brake-by-wire control program employed in the second embodiment.

Referring to FIGS. 7 and 8, there is discussed a second embodiment of the brake-by-wire type brake system according to the present invention. The second embodiment according to the present invention is arranged to operate a line system of the circuit 17 connected to pump 28 as a brake-by-wire type brake system using the hydraulic pressure Pm of pump 28, and to directly operating the other line system using the hydraulic pressure Pm of master cylinder 3 so as to resolve the strange brake manipulation feeling during the stroke-simulator shutoff state.

FIG. 7 is a control program executed instead of the program of FIG. 2, and FIG. 8 is a control program executed instead of the program of FIG. 3. The control program shown in FIG. 7 includes steps S6 and S7 instead of steps S3 and S4 in FIG. 2 and is the program of determining whether or not it is necessary to execute one-line brake-by-wire control.

At step S1 in FIG. 7 it is determined whether or not both shutoff valves 20 and 21 are put in closed state. At step S2 it is determined whether or not stroke simulator shutoff flag SSF is set at 1. When both steps S1 and S2 make affirmation determinations, it is determined that there is caused a problem relating to the strange brake manipulation feeling, and therefore the program proceeds to step S6 wherein a one-line brake-by-wire control flag is set at 1 to output a one-line brake-by-wire control command in order to solve the strange feeling in the brake manipulation.

When the determination at step S2 is negative, that is, when stroke-simulator shutoff flag SSF is set at 0 (SSF=0), no problem as to the strange brake manipulation feeling causes, and therefore the program proceeds to step S7 wherein one-line brake-by-wire control flag is reset at 0 so not to generate one-line brake-by-wire control command.

When it is determined at step S1 that at least one of shutoff valves 20 and 21 is open (negative determination at step S1) and when it is determined at step S5 that stroke-simulator shutoff flag SSF is set at 0 (SSF=0) indicative that stroke simulator 31 is put in communicating state, the program proceeds to step S7 wherein one-line brake-by-wire control flag is reset at 0 as to prevent one-line brake-by-wire control command from being dully generated under a condition that piston 6 is position at the normal position.

FIG. 8 shows the control program for executing a one-line brake-by-wire control according to the one-line brake-by-wire control flag determined in the control of FIG. 7.

At step S14 in FIG. 8, it is determined whether or not the one-line brake-by-wire control command is outputted by checking whether or not the one-line brake-by-wire control flag is set at 1.

When the determination at step S14 is affirmative, that is, when it is determined at step S14 that the one-line brake-by-wire control command is outputted, the program proceeds to step S15 wherein the following control is executed in response to the above-discussed state at the moment that the ignition switch is turned on. That is, shutoff value 21 is turn off and is therefore opened, and communication value 27 is turned off and is therefore closed.

When the ignition switch is turned on, shutoff valve 20 is turned on and is closed. Therefore, in cooperation with the closing operation of communication valve 27, the braking operation to rear wheels 2 is normally executed by the brake-by-wire control.

More specifically, when the brake manipulation through brake pedal 4 is detected, pump 28 is driven, and the hydraulic pressure Pp of pump 28 is controlled at rear-wheel brake unit hydraulic pressure Pwr through the open/close (duty) control of pressure increasing valve 22 and pressure decreasing valve 24 according to the detection value of hydraulic pressure Pm supplied from tandem master cylinder 3. This enables the brake-by-wire control of being normally executed to be applied to the braking of rear wheels 2.

On the other hand, the other brake line system for front wheels 1 directly generates braking force at front wheels 1 by directly applying brake hydraulic pressure Pm of master cylinder to the circuit 19, since shutoff valve 21 is turned off to be put in open state and communication valve 28 is turned off to be put in closed state.

More specifically, since pressure increasing value 23 is turned off to be put in open state and pressure decreasing value 25 is turned off to be put in shutoff state when the ignition switch is turned on, brake hydraulic pressure Pm of master cylinder 3 is supplied to front wheel brake units 18 through shutoff vale 21 and pressure increasing value 23 which are put in open state. Therefore, this brake hydraulic pressure Pm functions as front wheel brake unit hydraulic pressure Pwf so as to generate braking force at front wheels 1.

With this one-line brake-by-wire control, when shutoff valves 20 and 21 for the two-line brake hydraulic pressure output circuits 17 and 19 are closed and when stroke simulator 31 is put in shutoff state relative to master cylinder 3, brake hydraulic pressure output circuit 17 is operated by hydraulic pressure Pp of pump 28, and brake hydraulic pressure output circuit 19 is directly operated by hydraulic pressure Pm of master cylinder 3. Therefore, pistons 5 and 6 of tandem master cylinder 3 are capable of being stroked. This arrangement solves the problem as to a strange brake manipulation feeling due to no brake manipulation stroke.

Further, although pistons 5 and 6 of tandem master cylinder 3 are cable of stroking, working fluid at the chambers 7 and 8 sandwiching piston 6 cannot change in volume.

Therefore, pistons 5 and 5 cannot return to the normal position over the depressed position set at the start of one-line brake-by-wire control. Accordingly, piston 6 cannot return to the normal position, and therefore open/close valve 32 is maintained at closed state. This prevents stroke simulator 31 from returning to the normal position.

In order to solve this problem, at step S16 in FIG. 8 it is determined whether or not the driver's foot was released from brake pedal 4 by detecting whether or not brake stroke sensor 106 functioning as brake switch is put in off state. Therefore, the one-line brake-by-wire control is repeated until the driver's foot is released from brake pedal 4. When the driver's foot is released form brake pedal 4, the program proceeds to step S17 wherein communication valve 27 is turned on to be put in closed state, and shutoff valve 20 is turned off to be put in open state. By this arrangement at step S16, shutoff valve 21 is open during the one-line brake-by-wire control. Accordingly, pump 28 is stopped by the start of the normal control in response to the release of brake pedal 4, and the working fluid in chambers 7 and 8 sandwiching piston 6 becomes movable. Consequently, pistons 5 and 6 are returned to the normal position over the depressed position set at the start of the one-line brake-by-wire control due to return springs 9 and 10. By returning piston 6 to the normal position, open/close valve 32 is put in open state, and therefore stroke simulator 31 is returned to the communicating state.

When stroke simulator 31 is put in communicating state, stroke-simulator shutoff flag SSF at step S2 in FIG. 7 is reset at 0 as discussed in the explanation of FIG. 5, and therefore the one-line brake-by-wire flag is reset at 0 at step S7 in FIG. 7. Accordingly, the program in FIG. 8 proceeds from step S14 to step S18 wherein shutoff valves 20 and 21 are turned off and are put in closed state.

With this arrangement, the brake system according to the second embodiment of the present invention is completely returned to a condition of functioning as a two-line brake-by-wire system.

Although the second embodiment of the brake system according to the present invention has been shown and described such that the brake-by-wire type brake system shown in FIG. 1 executes the one-line brake-by-wire control at the circuit 17 near pump 28 to generate braking force at rear wheels 2 and executes the hydraulic pressure brake control at the circuit 18 apart from pump 28 using the hydraulic pressure Pm of master cylinder 3 to generate braking force at front wheels 1, the invention is not limited to this and may be applied to the other modifications.

For example, a hydraulic source similar to pump 28 is provided for the front-wheel brake line in addition to pump 28 for the rear-wheel brake line, and the front and rear wheels 1 and 2 are controlled by the brake-by-wire control using independent hydraulic sources. This arrangement enables the brake-by-wire control to be applied to a desired one of the front-wheel brake line and the rear-wheel brake line, and the hydraulic pressure Pm of master cylinder 3 to be applied to the other brake line.

Figure 9:
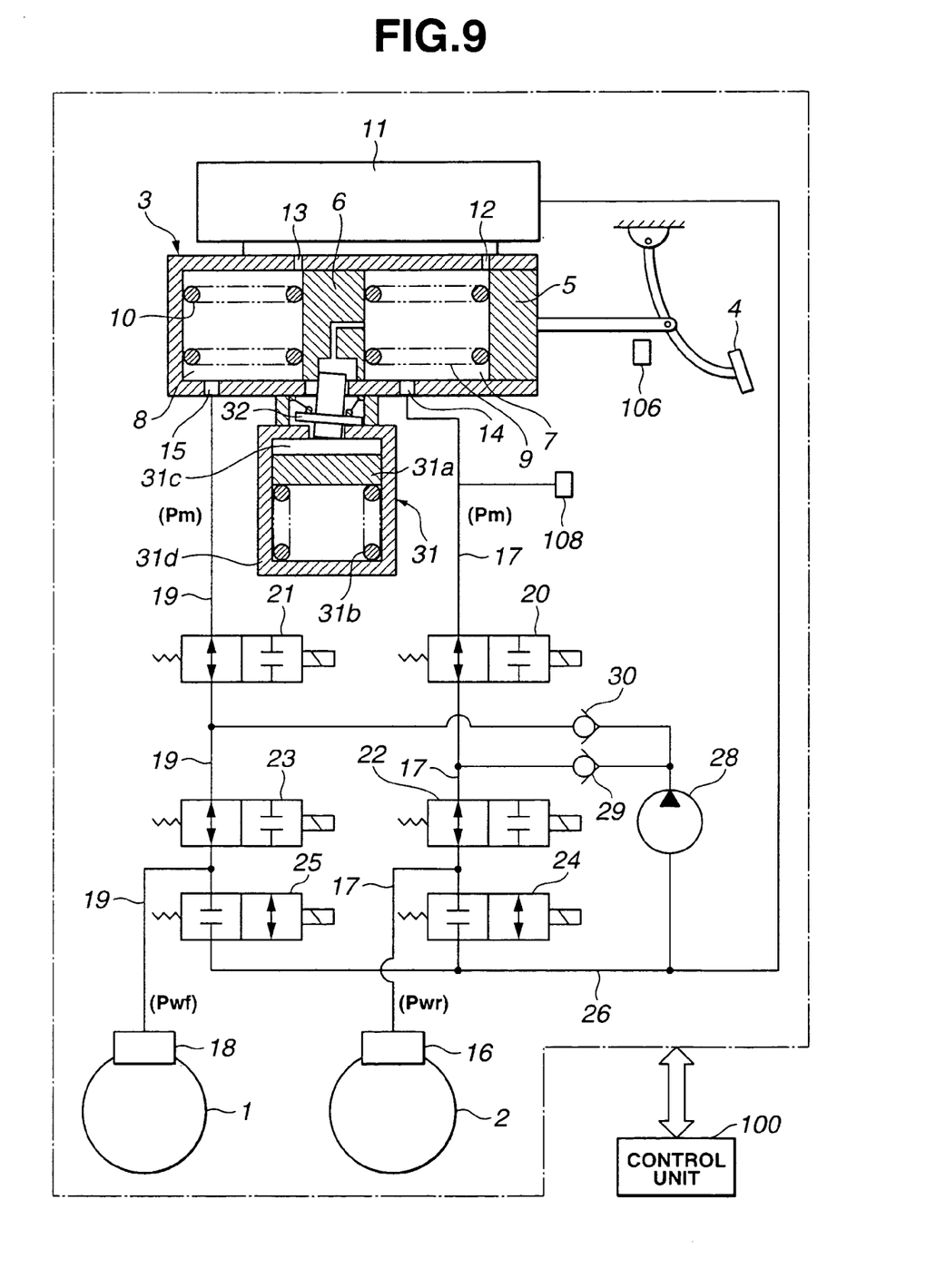
FIG. 9 is a schematic view showing a third embodiment of the brake system according to the present invention.

Further, the present invention is not limited to the brake system shown in FIG. 1, and may be applied to a brake-by-wire type brake system which is arranged such that the hydraulic pressure Pp of pump 28 is supplied through check valves 29 and 30 to the circuit 17 between shutoff valve 20 and pressure increasing valve 22 and the circuit 19 between shutoff valve 21 and pressure increasing valve 23, respectively, as shown in FIG. 9. In case that the present invention is applied to the brake-by-wire type brake system shown in FIG. 9, it becomes unnecessary to control communication valve 27, and therefore the control is preferably simplified.

This application is based on Japanese Patent Application No. 2003-390899 filed on Nov. 20, 2003 in Japan. The entire contents of this Japanese Patent Application are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A vehicle brake system comprising:
   a first motion means having a first motion element which moves according to a driver's brake manipulation, the first motion means outputting a brake hydraulic pressure according to a depressing force of the first motion element;
   a wheel brake unit through which a braking force is generated at wheels;
   a brake hydraulic pressure output circuit connecting the first motion means and the wheel brake unit;
   a shutoff valve disposed in the brake hydraulic circuit, the shutoff valve shutting off a fluid communication between the first motion means and the wheel brake unit;
   a hydraulic source different from the first motion means, the hydraulic source being connected to the brake hydraulic pressure output circuit between the shutoff valve and the wheel brake unit;
   a hydraulic pressure controlling means for producing a unit hydraulic pressure in the brake hydraulic pressure output circuit between the shutoff valve and the wheel brake unit by controlling a hydraulic pressure of the hydraulic source different from the first motion means according to the brake hydraulic pressure of the first motion means when the shutoff valve is closed;
   a stroke simulator being shut off from the first motion means when the first motion element moves from a normal position, the stroke simulator being communicated with the first motion means so as to generate a stroke of the driver's brake manipulation when the shutoff valve is closed and the first motion element is positioned at the normal position;
   a stroke simulator shutoff/communication detecting means detecting whether the stroke simulator is in shutoff state or communicating state when the shutoff valve is closed; and
   a stroke-simulator state controlling means returning the first motion element to the normal position using the hydraulic pressure of the hydraulic source by temporally opening the shutoff valve when the shutoff valve is closed and the stroke simulator is put in shutoff state, the stroke-simulator state controlling means closing the shutoff valve when the stroke simulator is put in communicating state due to the returning of the first motion element to the normal position.

2. The vehicle brake system as claimed in claim 1, wherein the first motion means includes a tandem master cylinder which has a primary piston functioning as a primary first motion element of receiving the driver's brake manipulation and a secondary piston functioning as a secondary first-motion element of receiving the driver's brake manipulation through the primary piston, the stroke simulator changing the communication/shutoff state according to a motion of the secondary piston, the shutoff valve includes first and second shutoff valves, the brake hydraulic pressure output circuit including first and second brake hydraulic pressure output circuits, the wheel brake unit including first and second wheel brake units, the first and second shutoff valves being disposed in the first and second brake hydraulic pressure output circuits, respectively, a communication valve connecting the first brake hydraulic pressure output circuit between the first shutoff valve and the first wheel brake unit and the second brake hydraulic pressure output circuit between the second shutoff valve and the second wheel brake unit, the hydraulic source different from the tandem master cylinder being connected to the first and second brake hydraulic pressure output circuits, wherein the secondary piston is returned to the normal position by temporally opening the second shutoff valve so as to receive the hydraulic pressure of the hydraulic source different from the tandem master cylinder when both of the first and second shutoff valves are closed and the stroke simulator is put in the shutoff state, and the second shutoff valve is closed when the stroke simulator is put in the communicating state by the returning of the secondary piston.

3. The vehicle brake system as claimed in claim 1, wherein the first motion means includes a tandem master cylinder which has a primary piston functioning as a primary first-motion element of receiving the driver's brake manipulation and a secondary piston functioning as a secondary first-motion element of receiving the driver's brake manipulation through the primary piston, the stroke simulator changing the communication/shutoff state according to a motion of the secondary piston, the shutoff valve including first and second shutoff valves, the brake hydraulic pressure output circuit including first and second brake hydraulic pressure output circuits, the first and second shutoff valves being disposed in the first and second brake hydraulic pressure output circuits, respectively, the hydraulic source different from the tandem master cylinder being connected to the first and second brake hydraulic pressure output circuits through first and second check valves, the hydraulic pressure of the different hydraulic source being controlled so as to produce the unit hydraulic pressure of the first and second hydraulic pressure output circuits when both of the first and second shutoff valves are closed, wherein the secondary piston is returned to a normal position by temporally opening the second shutoff valve when the stroke simulator is put in the shutoff state and both of the first and second shutoff valves are closed, and the second shutoff valve is closed when the stroke simulator is put in the communicating state by the returning of the secondary piston to the normal position.

4. The vehicle brake system as claimed in claim 1, wherein the stroke-simulator shutoff/communication detecting means detects a stroke quantity of the driver's brake manipulation when the shutoff valve is open, and the stroke-simulator shutoff/communication detecting means determines that the stroke simulator is put in the shutoff state when a detection value of the stroke quantity is greater than or equal to a first preset value.

5. The vehicle brake system as claimed in claim 1, wherein the stroke-simulator shutoff/communication detecting means detects a stroke quantity of the driver's brake manipulation and the brake hydraulic pressure of the first motion means, and the stroke-simulator shutoff/communication detecting means determines that the stroke simulator is put in the shutoff state when a rate of change of a detection value of the brake hydraulic pressure of the first motion means relative to a change of the stroke quantity is greater than a second preset value.

6. The vehicle brake system as claimed in claim 1, wherein the stroke-simulator shutoff/communication detecting means determines that the stroke simulator is put in the shutoff state when the shutoff valve is closed during a period when the driver's brake manipulation is being executed.

7. The vehicle brake system as claimed in claim 1, wherein the stroke-simulator shutoff/communication detecting means determines that the stroke simulator is put in the communicating state when a stroke quantity of the driver's brake manipulation becomes smaller than a third preset value during a period when the driver's brake manipulation is being executed.

8. The vehicle brake system as claimed in claim 1, wherein the stroke-simulator shutoff/communication detecting means detects a stroke quantity of the driver's brake manipulation and the brake hydraulic pressure of the first motion means, and the stroke-simulator shutoff/communication detecting means determines that the stroke simulator is put in the communicating state on the basis of a comparison between a standard value obtained from the brake hydraulic pressure of the first motion means and a detection value of the stroke quantity.

9. The vehicle brake system as claimed in claim 1, wherein the stroke-simulator shutoff/communication detecting means determines that the stroke simulator is put in the communicating state when the first motion element has been returned to the normal position and the first motion element is communicated with a reservoir.

10. The vehicle brake system as claimed in claim 1, wherein the stroke simulator is directly connected to the first motion means.

11. A vehicle brake system comprising:
a master cylinder comprising a piston depressed according to a driver's brake manipulation, the master cylinder outputting a brake hydraulic pressure according to a depression force of the piston;
a wheel brake unit through which braking force is generated at wheels according to the brake hydraulic pressure;
a brake hydraulic pressure output circuit connecting the master cylinder and the wheel brake unit;
a shutoff valve disposed in the brake hydraulic pressure output circuit, the shutoff valve shutting off a fluid communication between the master cylinder and the wheel brake unit;
a pump connected to the brake hydraulic pressure output circuit between the shutoff valve and the wheel brake unit;
a stroke simulator connected to the master cylinder, the stroke simulator generating a stroke of the driver's brake manipulation when the shutoff valve is closed and the piston of the master cylinder is positioned at a normal position; and
a control unit connected to the shutoff valve and the pump, the control unit being arranged:
to detect whether the stroke simulator is put in a communicating state or a shutoff state relative to the master cylinder when the shutoff valve is closed,
to open the shutoff valve so as to return the piston of the master cylinder to the normal position by supplying a hydraulic pressure of the pump to the master cylinder when the shutoff valve is closed and the stroke simulator is put in the shutoff state, and to close the shutoff valve when the stroke simulator is put in the communicating state by returning the piston of the master cylinder to the normal position.

12. The vehicle brake system as claimed in claim 11, wherein the stroke simulator is directly connected to the master cylinder.

13. A method of controlling a brake-by-wire type brake system which comprises a master cylinder having a piston depressed according to a driver's brake manipulation, a wheel brake unit through which braking force is generated at wheels according to a brake hydraulic pressure, a brake hydraulic pressure output circuit connecting the master cylinder and the wheel brake unit, a shutoff valve disposed in the brake hydraulic pressure output circuit and shutting off a fluid communication between the master cylinder and the wheel brake unit, a pump connected to the brake hydraulic pressure output circuit between the shutoff valve and the wheel brake unit and a stroke simulator connected to the master cylinder so as to generate a stroke of the driver's brake manipulation when the shutoff valve is closed and the piston of the master cylinder is positioned at a normal position, the method comprising:

detecting whether the stroke simulator is put in a communicating state or a shutoff state relative to the master cylinder when the shutoff valve is closed,     returning the piston of the master cylinder to the normal position by opening the shutoff valve so as to supply a hydraulic pressure of the pump to the master cylinder when the shutoff valve is closed and the stroke simulator is put in the shutoff state; and     closing the shutoff valve when the stroke simulator is put in the communicating state by returning the piston of the master cylinder to the normal position.

14. The method of controlling a brake-by-wire brake system according to claim 13, wherein the stroke simulator is directly connected to the master cylinder.

15. A vehicle brake system comprising:

a tandem master cylinder having a primary piston which strokes according to a driver's brake manipulation and a secondary piston which strokes according to the driver's brake manipulation through the primary piston;

first and second brake hydraulic pressure output circuits through which a hydraulic pressure generated by the tandem master cylinder is supplied to first and second wheel brake units, respectively;

first and second shutoff valves disposed in the first and second brake hydraulic pressure output circuits, respectively, the first and second shutoff valves being capable of shutting off communications between the tandem master cylinder and the first and second wheel brake units, respectively;

a pump connected to the first brake hydraulic pressure output circuit between the first shutoff valve and the first wheel brake unit and the second brake hydraulic pressure output circuit between the second shutoff valve and the second wheel brake unit;

a stroke simulator shut off from the tandem master cylinder when the secondary piston moves from a normal position, the stroke simulator being communicated with the tandem master cylinder so as to generate a stroke of the driver's brake manipulation when the first and second shutoff valves are closed and the secondary piston is positioned at the normal position; and     a control unit connected to the first and second shutoff valves and the pump, the control unit being arranged:

to produce a first unit hydraulic pressure at the first brake hydraulic pressure output circuit between the first shutoff valve and the first wheel brake unit and a second unit hydraulic pressure at the second brake hydraulic pressure output circuit between the second shutoff valve and the second wheel brake unit by controlling a hydraulic pressure of the pump on the basis of a hydraulic pressure detection value of the tandem master cylinder when the first and second shutoff valves are closed,         to detect whether the stroke simulator is in a shutoff state or a communicating state when both of the first and second shutoff valves are closed,         to supply the hydraulic pressure of the tandem master cylinder to the first brake hydraulic pressure output circuit by opening the first shutoff valve when both of the first and second shutoff valves are closed and the stroke simulator is put in the shutoff state, and         to supply the hydraulic pressure of the pump to the second brake hydraulic pressure output circuit by closing the second shutoff valve when the stroke simulator is put in the shutoff state.

16. The vehicle brake system as claimed in claim 15, wherein the stroke simulator is directly connected to the tandem master cylinder.

\* \* \* \* \*